(12) United States Patent
Friedrich et al.

(10) Patent No.: US 11,738,372 B2
(45) Date of Patent: Aug. 29, 2023

(54) SYSTEM FOR WASHING A 3D-PRINTED OBJECT

(71) Applicant: 3M INNOVATIVE PROPERTIES COMPANY, St. Paul, MN (US)

(72) Inventors: Anja Friedrich, Munich (DE); Michael Jahns, Gilching (DE); Malte Korten, Moorenweis (DE); Christian A. Richter, Feldafing (DE); Bastian P. Kirchner, Fürstenfeldbruck (DE); Gallus Schechner, Herrsching (DE); Daniel D. Oberpertinger, Herrsching (DE); Wolfgang Weinmann, Weilheim (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 341 days.

(21) Appl. No.: 16/769,310

(22) PCT Filed: Dec. 6, 2018

(86) PCT No.: PCT/IB2018/059727
§ 371 (c)(1),
(2) Date: Jun. 3, 2020

(87) PCT Pub. No.: WO2019/111208
PCT Pub. Date: Jun. 13, 2019

(65) Prior Publication Data
US 2020/0324479 A1    Oct. 15, 2020

(30) Foreign Application Priority Data
Dec. 8, 2017 (EP) .................................... 17206075

(51) Int. Cl.
*B08B 3/10* (2006.01)
*A61C 5/77* (2017.01)
(Continued)

(52) U.S. Cl.
CPC ................ *B08B 3/104* (2013.01); *A61C 5/77* (2017.02); *B22F 10/12* (2021.01); *B22F 10/68* (2021.01);
(Continued)

(58) Field of Classification Search
CPC ......... B29C 64/35; B29C 64/245; A61C 5/77; A61C 5/70; B08B 3/104; B08B 11/02;
(Continued)

(56) References Cited

U.S. PATENT DOCUMENTS

| | | |
|---|---|---|
| 5,482,659 A | 1/1996 | Sauerhofer |
| 5,741,368 A | 4/1998 | Sahbari |

(Continued)

FOREIGN PATENT DOCUMENTS

| | | |
|---|---|---|
| CN | 1973752 | 6/2007 |
| CN | 204076853 | 1/2015 |

(Continued)

OTHER PUBLICATIONS

International Search Report for PCT International Application No. PCT/IB2018/059727 dated Mar. 20, 2019, 6 pages.

*Primary Examiner* — Nahida Sultana

(57) ABSTRACT

A system (1) for washing a 3D-printed object (4). The system (1) has a washing device (2) and a workpiece (3) that includes the 3D-printed object (4). The washing device (2) has a container (7) that forms a process chamber (8) for receiving a liquid cleaning agent (9), and the container (7) has an inlet (10) into the process chamber (8). The workpiece (3) further has a support structure (6) that supports the 3D-printed object (4) and a base (5) supporting the support structure (6). The base (5), in a mating relationship with the inlet (10), forms a restraint preventing the workpiece (3) from passing through the inlet (10) in a situation in which (Continued)

the workpiece (3) is placed with the 3D-printed object (4) located within the process chamber (8).

10 Claims, 2 Drawing Sheets

(51) Int. Cl.
| | |
|---|---|
| *B29C 64/35* | (2017.01) |
| *B33Y 40/20* | (2020.01) |
| *B22F 10/12* | (2021.01) |
| *B22F 10/68* | (2021.01) |
| *B22F 12/10* | (2021.01) |
| *B22F 12/90* | (2021.01) |
| *B33Y 80/00* | (2015.01) |
| *B29L 31/00* | (2006.01) |
| *B22F 10/40* | (2021.01) |

(52) U.S. Cl.
CPC ............ *B22F 12/10* (2021.01); *B22F 12/90* (2021.01); *B29C 64/35* (2017.08); *B33Y 40/20* (2020.01); *B22F 10/40* (2021.01); *B29L 2031/7536* (2013.01); *B33Y 80/00* (2014.12)

(58) Field of Classification Search
CPC ... B08B 3/10; B08B 13/00; B29L 2031/7536; B33Y 40/20; B33Y 80/00; B33Y 40/00; B22F 10/10; B22F 2003/241; Y02P 10/25
See application file for complete search history.

(56) References Cited

U.S. PATENT DOCUMENTS

| | | | |
|---|---|---|---|
| 6,109,277 A * | 8/2000 | Linton | B08B 3/02 |
| | | | 134/179 |
| 6,624,128 B1 | 9/2003 | Smiley | |
| 2005/0103360 A1* | 5/2005 | Tafoya | B08B 3/045 |
| | | | 134/25.4 |
| 2011/0241947 A1* | 10/2011 | Scott | B22F 12/30 |
| | | | 428/156 |
| 2012/0010063 A1* | 1/2012 | Levitt | B01D 21/267 |
| | | | 494/83 |
| 2012/0195994 A1 | 8/2012 | El-Siblani et al. | |
| 2013/0307193 A1* | 11/2013 | Johnson | C09J 179/00 |
| | | | 264/401 |
| 2014/0048097 A1 | 2/2014 | Bueche et al. | |
| 2015/0102531 A1* | 4/2015 | El-Siblani | B33Y 10/00 |
| | | | 425/174 |
| 2017/0250095 A1 | 8/2017 | Kim | |
| 2017/0326787 A1 | 11/2017 | Wattyn | |
| 2019/0240924 A1* | 8/2019 | Hendrik | B29C 71/04 |
| 2020/0109357 A1 | 4/2020 | Jahns | |
| 2020/0198242 A1* | 6/2020 | John | B29C 64/35 |

FOREIGN PATENT DOCUMENTS

| | | |
|---|---|---|
| CN | 205008301 | 2/2016 |
| CN | 105436120 | 3/2016 |
| CN | 205058635 | 3/2016 |
| CN | 105562395 | 5/2016 |
| CN | 206632024 | 11/2017 |
| DE | 10 2009 061 069 | 11/2009 |
| GB | 825389 | 2/1958 |
| JP | 04343361 | 11/1992 |
| JP | 2000331972 A | 11/2000 |
| JP | 2011000566 | 1/2011 |
| TW | I221100 | 9/2004 |
| WO | WO 1997-12759 | 4/1997 |
| WO | WO 2005-113240 | 12/2005 |
| WO | WO 2010-071759 | 6/2010 |
| WO | 2013064857 A1 | 5/2013 |
| WO | WO 2015-070165 | 5/2015 |
| WO | WO 2017/017272 | 2/2017 |

* cited by examiner

SYSTEM FOR WASHING A 3D-PRINTED OBJECT

FIELD OF THE INVENTION

The invention relates to a system for washing a 3D-printed object, and in particular to a system that has a washing device with a process chamber within which a workpiece is provided that has a base for preventing the workpiece from falling in the process chamber.

BACKGROUND ART 3D-printing is meanwhile widely used in the industry. There are various techniques and devices for 3D-printing of objects on the market. Some 3D-printing devices are based on stereolithography. Data of the object that is often based on computer aided design (CAD) is typically used to project a light pattern on a layer of light hardenable resin. The light hardenable resin typically solidifies in consequence of the exposure of the light so that a layer of solidified resin according to the pattern is formed. A desired three-dimensional object is created by consecutively adding layers. Thereby the pattern is controlled according to the desired shape of the three-dimensional object.

Typically at the boundary between the object and the light hardenable resin some of the light hardenable resin resides on the object after building up the object. The light hardenable resin typically resides on the object in varying amounts, depending for example on the viscosity of the light hardenable resin. This excess resin is generally undesired because it forms an additional structure on the actual shape of the object and because the light hardenable resin often is sticky, may contain undesired monomers and/or may (as such) not form a durable structure. Therefore, currently such residual light hardenable resin is often post-cured to provide the object with a solid surface. According to another approach the object is cleaned mechanically or with aid of chemical solutions and optionally post-cured after.

Although cleaning is desired particularly for 3D-printed objects made from light hardenable resins there are other 3D-printing techniques from which object are obtainable that desirably are to be cleaned after. For example objects that are printed by a 3D-printing technique in which a removable material is printed as a support structure along with the object typically have to be cleaned after the object is built up. Various ways of cleaning and corresponding cleaning agents have been proposed.

For example patent application no. EP17173184.7 filed on 29 May 2017 by the same applicant discloses the use of a cleaning composition for cleaning 3D-printed articles, the cleaning composition comprising either of the following components alone or in combination: di basic esters of a carboxylic acid, tri basic esters of a carboxylic acid. Further, a process of cleaning a 3D-printed article is disclosed. The process comprises the steps of a) providing the cleaning composition as described in any of the preceding claims and a 3D-printed article, b) treating the surface of the 3D-printed article with the cleaning composition, c) optionally treating the 3D article with a solvent, in particular water, d) optionally drying the 3D article, optionally repeating steps b), c) and d) either singly or in combination.

However, although existing approaches for cleaning 3D-printed objects provide useful results, there is still a desire for a technical solution that allows for gently and effectively cleaning 3D-printed objects.

SUMMARY OF THE INVENTION

The invention relates to a system for washing or cleaning a 3D-printed object. The system comprises a washing device and at least one workpiece. The workpiece comprises the 3D-printed object. The workpiece further comprises at least one support structure supporting the 3D-printed object and a base supporting the support structure.

The washing device comprises a container that forms a process chamber. The process chamber is configured for receiving a liquid cleaning agent. The container has an inlet into the process chamber.

The base, in a mating relationship with the inlet, forms a restraint that prevents the workpiece from (entirely) passing or from falling through the inlet in a situation in which the workpiece is placed with the 3D-printed object located within the process chamber. Generally, the workpiece may be retained relative to the container so that the workpiece is accommodated partially inside the process chamber and partially outside the process chamber or outside container.

The invention is advantageous in that it allows the cleaning of a 3D-printed object without contamination of all portions of the 3D-printed object with the cleaning agent. Further the invention is advantageous in that it allows for a controlled handling of the 3D-printed object during and after cleaning. In particular the system allows the workpiece to be positioned at a determined location from which the workpiece can be picked up again after cleaning. In addition, contamination of the surrounding of the system by a cleaning agent used for cleaning the object can be minimized.

The term "washing" as used herein refers to exposing the 3D-printed object with a cleaning agent.

In an embodiment the base forms a perforated build platform at which the support structures are retained. The base may further form a receptacle for containing an amount of light hardenable resin from which the 3D-printed object is printed.

In an embodiment the base forms a shoulder or protrusion which provides the restraint. The shoulder or protrusion may particularly form a stop that does not fit through the inlet in a situation in which the base is inserted in the inlet. The shoulder may for example be a circumferential rim that radially outwardly protrudes from a portion of the base.

In an embodiment the base may be made of a thermoplastic material. In particular the base may be made of at least one of polyethylene (PE), polypropylene (PP), polycarbonate (PC) and polymethyl-methacrylate (PMMA). The base may be further made of the same material as the 3D-printed object.

In an embodiment the base of the workpiece, in a mating relationship with the inlet of the container, closes the inlet. For example, the inlet may be formed by a through-hole through a wall that forms part of the container and the base and the through-hole are shaped and sized to snugly fit with one another. Therefore, in a situation in which the base is mated with the inlet, the base blocks or seals the through-hole. Thus, during cleaning of the 3D-printed object the cleaning agent is hindered in escaping from the process chamber. The inlet is preferably the only opening of the container, so that once the workpiece is inserted in the inlet, the process chamber is entirely closed.

In a further embodiment the washing device has a heating element. The washing device may further have a temperature sensor. Each of the heating element and the temperature sensor are preferably in fluid communication with the process chamber. This means that the heating element and the temperature sensor may be arranged at least partially within the process chamber. For example the heating element and the temperature sensor may be arranged so that the heating element can heat cleaning agent present in the process chamber and so that the temperature sensor can detect the temperature of the cleaning agent. Accordingly the system of the invention is configured to heat the cleaning agent at a determined temperature and to maintain it at that temperature (or at about that temperature). While the heating element may be configured to heat up toward several hundred degrees C. a preferred heating range is between 35° C. and 80° C. This enables the system to maximize a cleaning effect depending on the resin from which the 3D-printed object is obtained and from the cleaning agent used.

In a further embodiment the system further has a fill level sensor for sensing a fill level of cleaning agent present in the process chamber. The fill level sensor is preferably in fluid communication with the process chamber or may particularly be arranged at least partially therein. The fill level sensor may comprise one or more optical sensors for detecting the cleaning agent. Alternative fill level sensors are based on mechanical, ultrasound, capacitive and/or inductive sensors.

In a further embodiment the system comprises a contamination detector for detecting a degree of contamination of the cleaning agent. The contamination detector may be in fluid communication with the process chamber or may particularly be arranged at least partially within the process chamber. The contamination detector may be based on an optical sensor that cooperates with a light source for detecting a loss of light intensity of light emitted from the light source and travelling through the cleaning agent.

In one embodiment the washing device further has agitation means for agitating the cleaning agent. The agitation may be based on moving of the workpiece relative to the cleaning agent, by causing the cleaning agent to move relative to the workpiece or a combination thereof.

In an embodiment the agitation means comprises stirring means or a stirrer arranged within the process chamber. The agitation means may further comprise an electric motor. The stirring means is preferably operationally coupled to the motor and the motor may be arranged outside the process chamber. For example, the stirring means may be operationally coupled to the motor via a magnetic coupling. The term "operationally coupled" in this example means coupled by magnetic force.

In a further embodiment the stirring means is operationally coupled to a dental handpiece. In this embodiment the motor is comprised within the dental handpiece. The term "operationally coupled" in this example means coupled by mechanical force (for example the stirring means may be clamped in the dental handpiece). The dental handpiece is preferably removable from the washing device.

In an embodiment the washing device is integrated in a production line that comprises a 3D printing device. The term "integrated" in that regard shall mean that the 3D printing device and the system of the invention are logistically coupled. For example, the workpiece that is put out from the 3D printing device may be transferred in the washing device based on a common logistical schedule. Such a 3D printing device may be based on Stereolithography, although the present invention is not limited to a use with Stereolithography. The production line may have a handling robot for transferring the workpiece from the 3D printing device (or another device that is part of the production line) to the washing device. The term "Stereolithogaphy" for the purpose of the present specification shall cover the so-called Digital Light Processing (DLP) technique, in which successive layers of the light hardenable resin are irradiated by two-dimensional light patterns so as to create layers of hardened resin shaped in accordance to that pattern.

In a further embodiment the washing device is integrated in a production line that comprises at least one of a support removal device, a post curing device and a surface finishing device. The production line may further comprise a 3D printing device. Thus, the 3D-printed object may be provided fully automated.

In one embodiment the 3D-printed object is a dental restoration part, for example a crown, bridge, inlay or a replacement tooth.

In a further embodiment the 3D-printed object is made from a hardened resin comprising cured (meth)acrylate components and optionally fillers. Further, the cleaning agent may comprise di basic esters of a carboxylic acid and/or tri basic esters of a carboxylic acid. The carboxylic acid and/or tri basic esters of a carboxylic acid may be used alone or in combination.

The light hardenable (not yet hardened) resin from which the 3D-printed object is obtained may comprise a radically curable unsaturated monomer in an amount ranging from 20% to 99% per weight, an inorganic filler in an amount ranging from 1% to 80% per weight and a photoinitiator in an amount ranging from 0.001% to 5% per weight.

In one embodiment the system comprises an electronic control unit. The electronic control unit may be particularly configured to control an operation of the washing device. Each of the heating element, the temperature sensor, the level sensor and the contamination detector are preferably electrically connected to the control unit. Further, the control unit is preferably configured to control (for example switch on and switch off) the heating element depending on temperature information received from the temperature sensor. Thus the washing device may be equipped with a temperature control for the cleaning agent. Further, the control unit may be configured for controlling an operation of the motor of the agitation means, at least in the embodiment in which no dental handpiece is used. The control unit is preferably configured to enable or disable heating and/or an operation of the agitation means depending on level information received from the level sensor. Further, the control unit may be configured to enable or disable heating and/or an operation of the agitation means depending on contamination information received from the contamination detector.

In a further aspect the invention relates to method of washing a 3D-printed object. The method comprises the steps of:

providing a washing device (as defined herein in all embodiments in the system of the invention) that comprises a container forming a process chamber, the container having an inlet into the process chamber, the washing device further preferably comprise agitation means, a heating element and a temperature sensor;

providing a liquid cleaning agent in the process chamber;

providing a workpiece that comprises a support structure and a 3D-printed object supported by the support structure, wherein the workpiece has a base;

placing the workpiece with the 3D-printed object located within the process chamber and thereby mating the base with the inlet, wherein the base forms a restraint preventing the workpiece from passing through the inlet in consequence of the mating relationship between the inlet and the base; and agitating the cleaning agent provided in the process chamber by the agitation means.

In an embodiment the method further comprises the step of heating the cleaning agent by means of the heating element and the temperature sensor. The method may further comprise the step of maintaining the cleaning agent at a temperature of between 35° C. and 80° C.

In an embodiment the method further comprises the step of building up the 3D-printed object by successively hardening portions of a light hardenable resin. The method may further comprise the step of exposing such portion of light hardenable resin with light (for example UV-light) for hardening the portions.

DETAILED DESCRIPTION OF THE INVENTION

Figure 1:
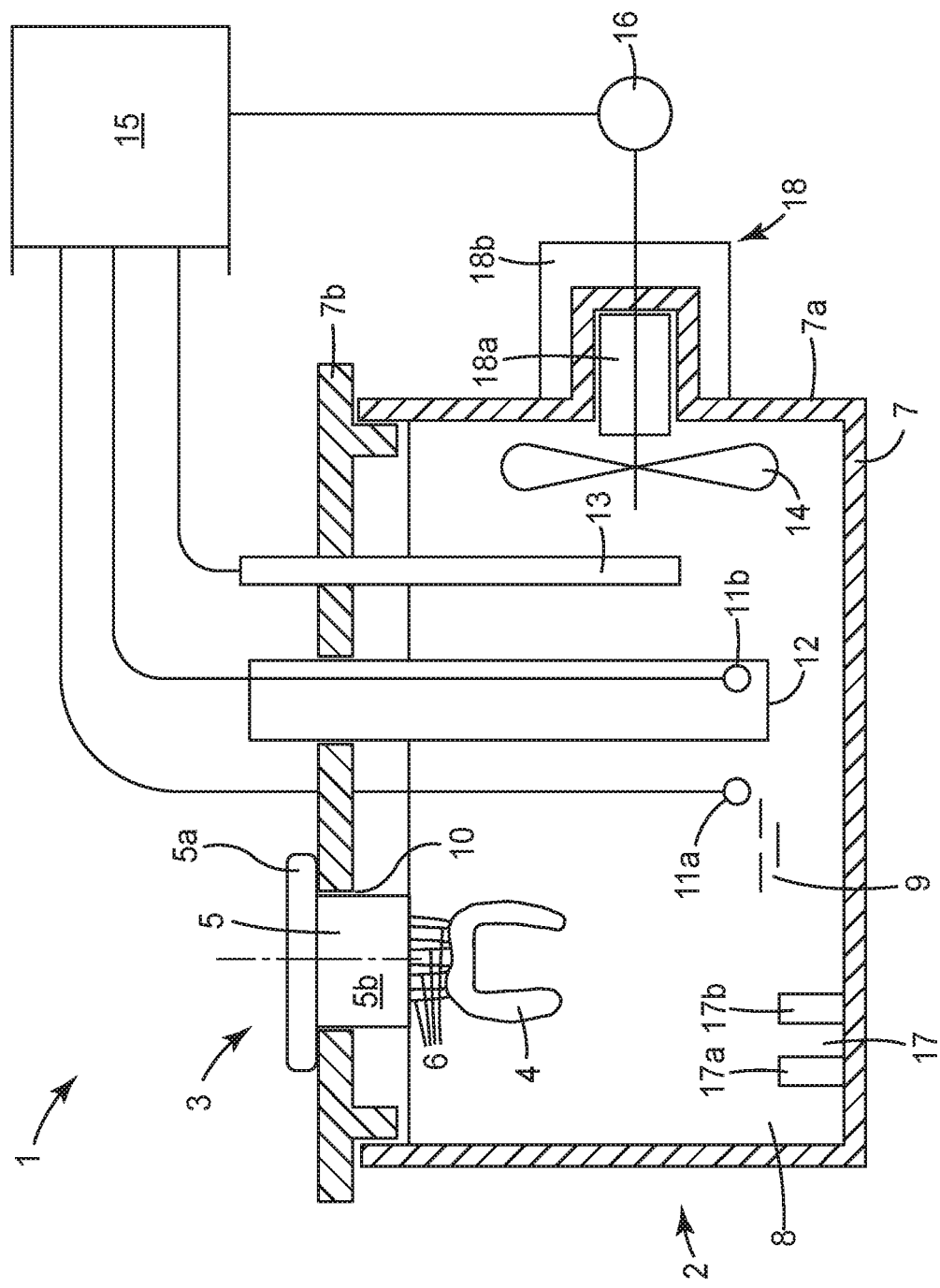
FIG. 1 is a cross-sectional view of a system according to an embodiment of the invention.

FIG. 1 shows a system 1 for washing a 3D-printed object 4. The system 1 comprises a washing device 2 for washing the 3D-printed object 4. The system 1 further comprises a workpiece 3. The workpiece 3 comprises the 3D-printed object 4. The workpiece 3 further comprises a base 5 and support structures 6 extending between the base 5 and the 3D-printed object 4.

The washing device 2 comprises a container 7 that forms a process chamber 8. In the example the container 7 has an open tank 7a that is closed by a lid 7b. However, other configurations are possible. The opening of the tank 7a is oriented upwards. The term "upwards" refers to a direction away from the center of gravity. The container 7 contains a liquid cleaning agent 9.

The container 7 (in the example in particular the lid 7b) has an inlet 10. In the example the inlet 10 is formed by a through-hole through the lid 7b. The workpiece 3 is inserted in the inlet 10. In particular the workpiece 3 is placed with the 3D-printed object 4 located within the process chamber 8. Therefore, the 3D-printed object 4 is also placed within the cleaning agent 9.

In the situation shown in the Figure the base 5 is mated with the inlet 10. The base 5 forms a restraint, in the example a shoulder 5a that forms a mechanical stop. The restraint may further be formed by an oversize of the base 5 for forming a press fit in the inlet 10. The restraint suspends the workpiece 3 at the lid 7b of the container. In other words, the restraint prevents the workpiece 3 from passing through the inlet. Therefore, once the workpiece 3 is placed through the inlet 10 so that the 3D-printed object 4 is located within the process chamber, the workpiece 3 is retained in position. Accordingly, the position of the workpiece 3 is known so that in an automated operation of the system 1 the workpiece 3 may be handled by a robot or other machinery. Further, due to the fact that the base 5 extends through the container 7, that part of the workpiece 3 that is located outside the process chamber is prevented from getting into contact with the cleaning agent. Therefore, in any handling, a portion of the workpiece 3 is kept free from cleaning agent so that that portion may be used for handling without the risk of contaminating a user's hand handling the workpiece 3 or a machine part that handles the workpiece 3.

The system 1 further has a heating element 12 and at least one temperature sensor 11a/11b. The heating element 12 serves for heating the cleaning agent 9. Further, the temperature sensor 11a/11b allows for monitoring a temperature. In the example a first temperature sensor 11a is provided for detecting the temperature of the cleaning agent 9 and a second temperature sensor 11b is provided for detecting the temperature of the heating element 12. The heating element 12 and the first sensor 11a and/or second temperature sensor 11b can therefore be used to heat the cleaning agent 9 toward a desired temperature and to maintain the cleaning agent 9 at that temperature.

The system 1 further has an electronic control unit 15. The control unit 15 may be configured to generally control one or more operations of the system 1. In the example the control unit 15 is configured to control the heating element dependent on temperature information received from a first and second temperature sensor 11a, 11b. Further the first and second temperature sensor 11a, 11b are electrically connected to the control unit 15. The first temperature sensor 11a can measure the actual temperature of the cleaning agent 9. The second temperature sensor 11b can be used to maximize the accuracy of the temperature control. For example, the temperature measured by the second temperature sensor 11b may be used to temporarily switch off the heating element 12 although the desired temperature of the cleaning agent 9 is not yet reached. Once the heating element 12 has cooled down a bit it may be switched on again, and so forth. This allows for minimizing overshooting of the temperature due to delays in heat transfer from the heating element 12 into the cleaning agent 9.

The system 1 further has a level sensor 13. The level sensor 13 is arranged for sensing a level of the cleaning agent 9 within the process chamber 8. Thus, it can be prevented that the amount of cleaning agent drops to a level (for example due to discharge of cleaning agent adhering at several workpieces cleaning in the system 1) in which the cleaning of the 3D-printed object 4 would be affected. The control unit 15 is configured to receive level information sensed by the level sensor 13 and to control the system dependent thereon. For example the control unit 15 is configured to enable or disable heating depending on the level of cleaning agent sensed within the process chamber 8. The level sensor 13 is connected to the control unit 15.

The system 1 further has a contamination detector for detecting a degree of contamination of the cleaning agent. In the example the contamination detector is a fork light barrier 17 that contains a light sender 17a and a light receiver 17b. The fork light barrier 17 is configured such that the light sender 17a emits light to the light receiver 17b. The intensity of light received by the light receiver 17b can be used to determine the degree of contamination of the cleaning agent 9. The control unit is configured to receive contamination information and to control the system dependent thereon.

The system 1 further has agitation means for agitating the cleaning agent. In the example the agitation means comprises a stirrer 14. The stirrer 14 is driven or drivable by a motor 16. The motor 16 in the example is connected to the control unit 15, and the control unit 15 is configured to control an operation of the motor 16. The control unit 15 is particularly configured to control the operation of the motor 16 dependent on the temperature information, the level information and/or the contamination information. For example the control unit 15 may be configured to enable or disable the operation of the motor 16 dependent on any of the temperature information, the level information and the contamination information.

In the example the stirrer 14 and the motor 16 are operationally coupled via a magnetic coupling 18. The magnetic coupling 18 has a driving part 18b and a driven part 18a. The motor 16 is mechanically connected to the driving part 18b. Further the driving part 18b and the driven part 18a are coupled by a magnetic field. The magnetic field may be provided by one or both of the driving or driven part 18b, 18a. For example each of the driving and driven part 18b, 18a may be a magnet so that the driven part 18a follows a movement of the driving part 18b by virtue of magnetic forces exerted between the driving and the driven part 18b, 18a. The magnetic coupling 18 provides an explosion-proof agitation means because the motor 16 can be arranged outside the process chamber 8 without a fixed connection to the stirrer 14. Therefore the system 1 allows for the use of solvent based cleaning agents (although other cleaning agents may be used).

Figure 2:
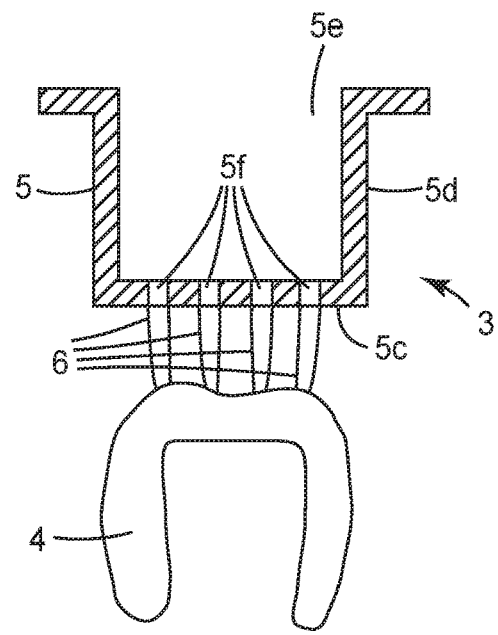
FIG. 2 is a cross-sectional detail view of a workpiece of a system according to an embodiment of the invention.

FIG. 2 shows the workpiece 3 in more detail. In the example the 3D-printed object 4 and the support structures 6 are printed from a light hardenable resin. A suitable resin is for example disclosed in patent application no. EP17173184.7 filed on 29 May 2017 by the same applicant, the content of which is incorporated by reference herein. The base 5 in the example is formed by a cup-shaped cartridge that has a perforated build platform 5c and a circumferential side wall 5d. The build platform 5c and the sidewall 5d in combination form a receptacle 5e for holding an amount of non-hardened resin. In a process of printing the 3D-printed object the build platform 5c is successively moved away from a transparent plate, underneath of which a light source is arranged, and portions of the resin are urged from the receptacle 5e through the perforation 5f and light hardened in an area between the build platform 5c and the transparent plate (not shown). A corresponding device and method for progressively building up an object from a light hardenable resin is disclosed in patent application no. PCT/US2017/044278 filed on 28 Jul. 2017 by the same applicant, the content of which is incorporated by reference herein. The base 5 may be made of a plastic material other than the light hardenable resin. For example the base may be made of a thermoplastic material and the base 5 may be injection molded.

Figure 3:
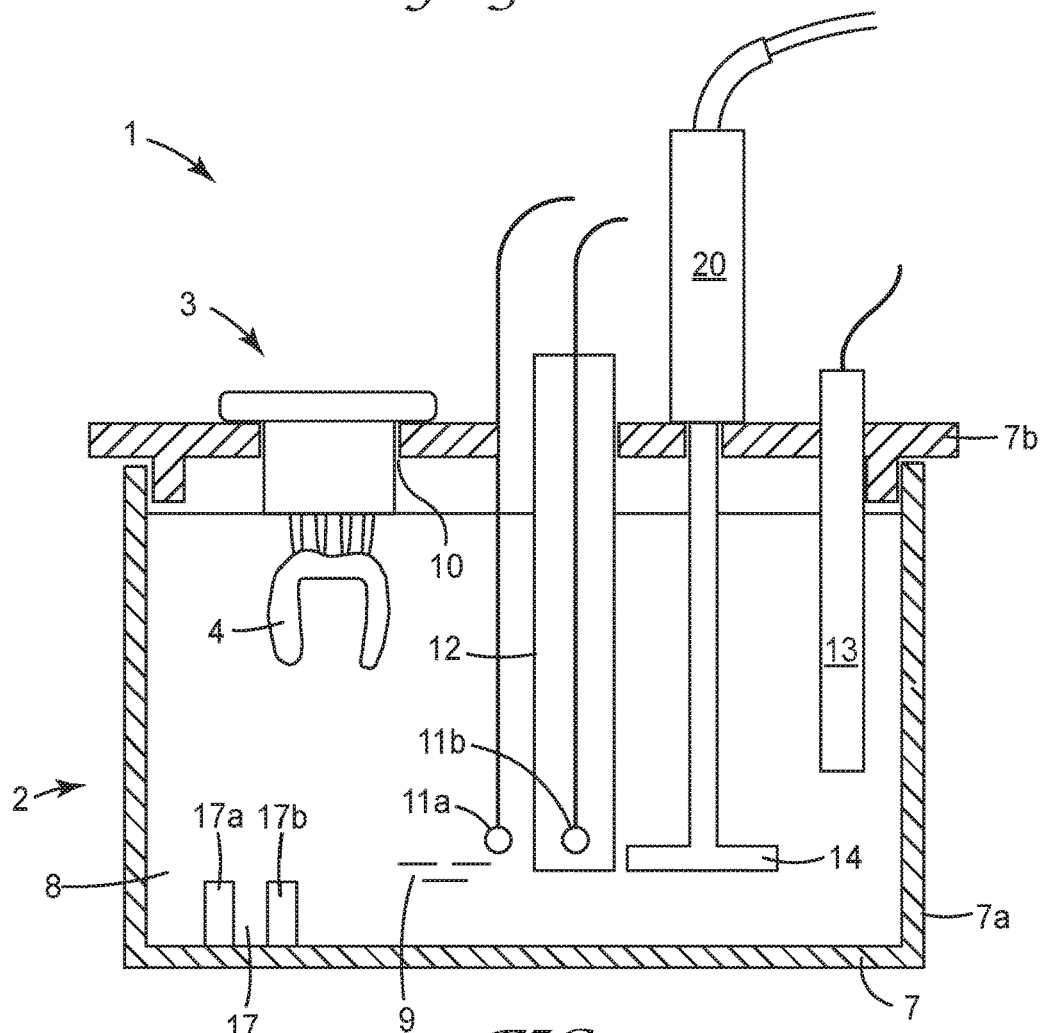
FIG. 3 is a cross-sectional view of a further system according to an embodiment of the invention.

FIG. 3 shows a further system 1 for washing a 3D-printed object 4. The system 1 comprises a washing device 2 for washing the 3D-printed object 4. The system 1 further comprises a workpiece 3 that comprises the 3D-printed object 4. The workpiece 3 in the example corresponds to the workpiece shown in FIGS. 1 and 2 and therefore further comprises a base 5 and support structures 6 extending between the base 5 and the 3D-printed object 4.

The washing device 2 comprises a container 7 that forms a process chamber 8. The container 7 has an open tank 7a that is closed by a lid 7b. The opening of the tank 7a is oriented upwards. The container 7 contains a liquid cleaning agent 9.

The container 7 (in particular the lid 7b) has an inlet 10. The inlet 10 is formed by a through-hole through the lid 7b. The workpiece 3 is inserted in the inlet 10 as already described in FIG. 1.

The system 1 further has a heating element 12, at least one temperature sensor 11a/11b. The system 1 further has a level sensor 13. The level sensor 13 is arranged for sensing a level of the cleaning agent 9 within the process chamber 8.

Further, a contamination detector for detecting a degree of contamination of the cleaning agent is provided in the system 1, in the form of a fork light barrier 17 as described in FIG. 1.

The system 1 further has agitation means for agitating the cleaning agent. In this example the agitation means comprises a stirrer 14 that is connected to a dental handpiece 20. The stirrer 14 and the dental handpiece 20 are removably attached at the container 7. Therefore the dental handpiece 20 can be used for other purposes when not in use within the system 1.

The system 1 may have a control unit (not illustrated) for controlling an operation of the heating element 12 and for controlling a temperature of the cleaning agent 9. Further, the control unit may be configured for operating the heating element dependent on level and/or contamination information received from the level sensor 13 and the contamination detector 17.

What is claimed is:

1. A system for washing a 3D-printed object, the system comprising:
    a washing device comprising a container forming a process chamber for receiving a liquid cleaning agent and, an agitator for agitating the cleaning agent, wherein the container further includes an inlet into the process chamber; and a
    and at least one workpiece that comprises the 3D-printed object, wherein the workpiece further comprises at least one support structure supporting the 3D-printed object and a base supporting the support structure, wherein the base, in a mating relationship with the inlet, closes the inlet and forms a restraint preventing the workpiece from passing through the inlet in a situation in which the workpiece is placed with the 3D-printed object located within the process chamber, wherein the 3D-printed object and the support structure comprise the same light hardenable resin, and wherein the base forms a perforated build platform retaining the support structure.

2. The system of claim 1, wherein the base includes a receptacle for the light hardenable resin.

3. The system of claim 1, further having a fill level sensor for sensing a fill level of cleaning agent present in the process chamber and, optionally, a contamination detector for detecting a degree of contamination of the cleaning agent, wherein the level sensor and the contamination detector, when present, being in fluid communication with the process chamber.

4. The system of claim 1, wherein the agitator comprises a stirring portion arranged within the process chamber, the stirring portion being operationally coupled to a motor that is arranged outside the process chamber.

5. The system of claim 4, wherein the stirring portion is operationally coupled to the motor via a magnetic coupling.

6. The system of claim 4, wherein the stirring portion is part of a dental handpiece, and wherein the motor is comprised within the dental handpiece.

7. The system of claim 1, wherein the washing device is integrated in a production line that comprises a 3D printing device.

8. The system of claim 1, wherein the washing device is integrated in a production line that comprises at least one of a support removal device, a post curing device and a surface finishing device.

9. The system of claim 1, wherein the 3D-printed object is a a crown, bridge, inlay or a replacement tooth.

10. The system of claim 1, wherein the 3D-printed object is made from a hardened resin comprising cured (meth)acrylate components and optionally fillers, and wherein the cleaning agent comprises di basic esters of a carboxylic acid and/or tri basic esters of a carboxylic acid.

\* \* \* \* \*

UNITED STATES PATENT AND TRADEMARK OFFICE
CERTIFICATE OF CORRECTION

PATENT NO. : 11,738,372 B2
APPLICATION NO. : 16/769310
DATED : August 29, 2023
INVENTOR(S) : Friedrich et al.

It is certified that error appears in the above-identified patent and that said Letters Patent is hereby corrected as shown below:

In the Claims

Column 8
Line 27, In Claim 1, delete "and a".
Line 67, In Claim 9, delete "is a a crown" and insert -- is a crown --, therefor.

Signed and Sealed this
Twelfth Day of March, 2024

Katherine Kelly Vidal
*Director of the United States Patent and Trademark Office*